United States Patent
Duan et al.

(10) Patent No.: US 12,551,513 B2
(45) Date of Patent: Feb. 17, 2026

(54) BACILLUS COAGULANS HAVING BLOOD GLUCOSE REDUCTION EFFICACY, AND APPLICATION THEREOF

(71) Applicants: QINGDAO VLAND BIOTECH INC., Shandong (CN); QINGDAO VLAND BIOTECH GROUP CO., LTD., Shandong (CN)

(72) Inventors: Zhi Duan, Shandong (CN); Hongchang Cui, Shandong (CN); Songjie Wu, Shandong (CN); Jingyan Zhang, Shandong (CN); Luxia Zhang, Shandong (CN)

(73) Assignees: QINGDAO VLAND BIOTECH INC., Shandong (CN); QINGDAO VLAND BIOTECH GROUP CO., LTD., Shandong (CN)

( * ) Notice: Subject to any disclaimer, the term of this patent is extended or adjusted under 35 U.S.C. 154(b) by 346 days.

(21) Appl. No.: 18/029,360

(22) PCT Filed: Jun. 21, 2021

(86) PCT No.: PCT/CN2021/101271
§ 371 (c)(1),
(2) Date: Mar. 29, 2023

(87) PCT Pub. No.: WO2022/068273
PCT Pub. Date: Apr. 7, 2022

(65) Prior Publication Data
US 2024/0000864 A1   Jan. 4, 2024

(30) Foreign Application Priority Data
Sep. 29, 2020 (CN) .......................... 202011045861.3

(51) Int. Cl.
*A61K 35/742* (2015.01)
*A61K 35/00* (2006.01)
(Continued)

(52) U.S. Cl.
CPC .............. *A61K 35/742* (2013.01); *A61P 3/10* (2018.01); *C12N 1/205* (2021.05); *A61K 2035/115* (2013.01); *C12R 2001/07* (2021.05)

(58) Field of Classification Search
CPC ............ A61K 35/742; A61K 2035/115; C12N 1/205; C12R 2001/07; A61P 3/10
See application file for complete search history.

(56) References Cited

U.S. PATENT DOCUMENTS

| 2006/0093591 A1 | 5/2006 | Farmer et al. |
| 2017/0042950 A1 | 2/2017 | Lau |

FOREIGN PATENT DOCUMENTS

| CN | 107616985 A | 1/2018 |
| CN | 111518720 A | 8/2020 |

(Continued)

OTHER PUBLICATIONS

English machine translation of CN-112259158-A (Year: 2021).*

(Continued)

*Primary Examiner* — Vanessa L. Ford
*Assistant Examiner* — Amelia Nicole Dickens
(74) *Attorney, Agent, or Firm* — Yue (Robert) Xu; Apex Attorneys at Law, LLP

(57) ABSTRACT

Provided are a *Bacillus coagulans* strain VHProbi C08 having a blood glucose reduction efficacy and an application thereof in preparation of a hypoglycemic product. The accession number of the strain is CCTCCM 2019738. Further provided is a hypoglycemic product comprising the *Bacillus coagulans* VHProbi C08 and/or the fermentation product of *Bacillus coagulans* VHProbi C08. A carbon (Continued)

source used in the culture medium of the strain is any one or more of fructooligosaccharide, galactooligosaccharides, and inulin.

2 Claims, 8 Drawing Sheets

(51) Int. Cl.
  *A61P 3/10*   (2006.01)
  *C12N 1/20*   (2006.01)
  *C12N 1/205*  (2026.01)
  *C12R 1/07*   (2006.01)

(56) References Cited

FOREIGN PATENT DOCUMENTS

| | | | | |
|---|---|---|---|---|
| CN | 111557366 A | 8/2020 | | |
| CN | 111676155 A | 9/2020 | | |
| CN | 112259158 A | * 1/2021 | ............... | C12Q 1/06 |
| CN | 113528367 A | 10/2021 | | |
| WO | 2017027601 A1 | 2/2017 | | |
| WO | 2018226271 A1 | 12/2018 | | |
| WO | WO-2019014645 A1 | * 1/2019 | ........... | A61K 31/715 |

OTHER PUBLICATIONS

Manna et al. "Beneficial role of vitamin K supplementation on insulin sensitivity, glucose metabolism, and the reduced risk of type 2 diabetes: A review", 2016, Nutrition, vol. 32, p. 732-739. (Year: 2016).*

Medalle et al. "Lactic Acidosis and Associated Hypoglycemia", Aug. 1971, Arch Intern Med., vol. 128 Issue 2, p. 273-278. (Year: 1971).*

Shudong et al. "Bioactivity and metabolomics changes of plant-based drink fermented by Bacillus coagulans VHProbi C08", 2022, LWT, vol. 156, Article 113030, p. 1-10 (Year: 2022).*

Su et al. "Physiological and fermentation properties of Bacillus coagulans and a mutant lacking fermentative lactate dehydrogenase activity", 2011, J Ind Microbiol Biotechnol, vol. 38, p. 441-450. (Year: 2011).*

Fang, Zhizhong et al.,Experimenal Study of Bacillus Coagulans ( TQ33) on Reducing Blood Sugar in Rats,Chinese Journal of Microecology,Oct. 30, 2001, Abstract only.

The 1st Office Action regarding Chinese Patent Application No. CN202011045861.3, Mailing date: Dec. 5, 2022.

Huijun Dong, Research Advances of Novel Microecologic Probiotics Bacillus coagulans,Food Science, 2010, vol. 31, No. 01, pp. 292-294, Abstract only.

The International Search Report and Written Opinion of the International Searching Authority for PCT/CN2021/101271 mailed Sep. 24, 2021.

The European Search Report issued on Apr. 23, 2025 for EP21873935.7.

Navid Mazruei Arani et al, The Effects of Probiotic Honey Consumption on Metabolic Status in Patients with Diabetic Nephropathy: a Randomized, Double-Blind, Controlled Trial, Probiotics and Antimicrobial Proteins, New York, NY ; Heidelberg : Springer, New York, NY ; Heidelberg : Springer, vol. 11, No. 4,Sep. 14, 2018 (Sep. 14, 2018), pp. 1195-1201, XP037245677,ISSN: 1867-1306, DOI:10.1007/S12602-018-9468-X C12N [retrieved on Sep. 14, 2018] A61K* p. 1197-p. 1198.

* cited by examiner

BACILLUS COAGULANS HAVING BLOOD GLUCOSE REDUCTION EFFICACY, AND APPLICATION THEREOF

CROSS REFERENCE TO RELATED APPLICATIONS

This application claims the priority of Chinese Patent Application No. 202011045861.3, filed with the China National Intellectual Property Administration on Sep. 29, 2020, and titled with "BACILLUS COAGULANS HAVING BLOOD GLUCOSE REDUCTION EFFICACY, AND APPLICATION THEREOF", which is hereby incorporated by reference.

FIELD

The present disclosure relates to the field of screening and application of probiotics, and in particular to a species of Bacillus coagulans strain having a function of reducing blood glucose and a use thereof.

BACKGROUND

Diabetes is a metabolic disorder mainly characterized by chronic hyperglycemia caused by the superposition of multiple factors. The continuous action of high-level blood glucose in the blood will cause chronic damage and dysfunction to the eyes, heart, blood vessels, etc., and eventually lead to complications such as blindness, uremia, cerebral stroke and myocardial infarction in patients, which endanger patients' life. According to data released by the World Health Organization, by 2017, Chinese diabetes patients had ranked first in the world, with 110 million people, accounting for one-tenth of the total number of Chinese adults.

Probiotics are live microorganisms that work by improving the balance of the intestinal microflora in hosts, and they can produce definite benefits to improve the microecological balance in hosts, which play a beneficial role. In 2001, the Food and Agriculture Organization of the United Nations (FAO) and the World Health Organization (WHO) defined probiotics as active microorganisms that confer a healthy benefit on the host when ingested in a sufficient quantity.

More and more evidences show that the beneficial effects of probiotics on the human body are not only limited to the gut, but also include a wider range of effects, such as regulation of endocrine balance, regulation of immune balance, regulation of nervous system, and regulation of respiratory system. Probiotics may ameliorate the blood glucose level of hosts by influencing mucosal immune mechanisms, interacting with commensal or potentially pathogenic microorganisms, producing metabolites such as short-chain fatty acids, and interacting with host cells through chemical signaling.

In recent years, researches and reports on the regulation of blood glucose by probiotics have appeared. For example, the Chinese invention patent with publication number CN104432001A discloses an edible probiotic culture composition, which can regulate intestinal microbiota and reduce blood glucose; the Chinese invention patent with publication number CN105039217A discloses a probiotic hypoglycemic preparation, which is prepared by fermenting three kinds of probiotics, and has blood glucose reduction efficacy in animal tests; the Chinese invention patent with publication number CN106619743A discloses a probiotic solid beverage with blood glucose reduction effect and a preparation method thereof, wherein the probiotic solid beverage is compounded by probiotics and prebiotics; the Chinese invention patent with publication number CN111084385A discloses a probiotic functional food with blood glucose reduction efficacy, which is prepared by four kinds of lactic acid bacteria and auxiliary materials. Taken together, the currently disclosed probiotics for reducing blood glucose are prepared by compounding multiple strains of different genus and prebiotics in proportion.

SUMMARY

The purpose of the present invention is to provide a Bacillus coagulans strain having blood glucose reduction efficacy and a use thereof, wherein the provided Bacillus coagulans strain can effectively relieve the symptoms of hyperglycemia.

One aspect of the present invention is to provide a Bacillus coagulans strain, named as Bacillus coagulans VHProbi C08, which has been deposited in the China Center for Type Culture Collection of Wuhan University, China on Sep. 23, 2019, and the accession number thereof is CCTCC M 2019738.

Use of the Bacillus coagulans strain provided by the present invention in the manufacture of a hypoglycemic product is also provided.

The present invention also provides a hypoglycemic product comprising the Bacillus coagulans VHProbi C08 and/or the fermentation product of Bacillus coagulans VHProbi C08.

Further, a carbon source used in the culture medium of the Bacillus coagulans VHProbi C08 is any one or more selected from the group consisting of fructooligosaccharides (FOS), galactooligosaccharides (GOS), and inulin.

The Bacillus coagulans VHProbi C08 provided by the present invention has the efficacy of reducing blood glucose. The hyperglycemia model mice induced by STZ were treated with the Bacillus coagulans VHProbi C08 provided by the present invention, and the symptoms of hyperglycemia thereof were significantly relieved compared with the placebo group, indicating that the Bacillus coagulans VHProbi C08 can effectively relieve the symptoms of hyperglycemia.

The Bacillus coagulans VHProbi C08 provided by the present invention can achieve the blood glucose reduction efficacy alone. In addition, the carbon source metabolism test and the whole genome sequencing confirm that this strain has a potential metabolic pathway for reducing blood glucose. Therefore, the probiotic preparation made from this strain has an efficacy of reducing blood glucose, and no additional probiotics is needed to be compounded.

The Bacillus coagulans VHProbi C08 provided by the present invention has no toxic effect on the body, so it could be added to foods to prepare functional foods with blood glucose reduction efficacy, which has broad application prospects.

BRIEF DESCRIPTION OF DRAWINGS

FIG. 2 is the spectrum of the total proteins of Bacillus coagulans VHProbi C08. Due to the limitation of page size, FIG. 2 is split into two figures: FIG. 2A and FIG. 2B, wherein FIG. 2A shows the spectrum within the range of 0-11000 of the horizontal axis, and FIG. 2B shows the spectrum within the range of 11000-20000 of the horizontal axis.

DETAILED DESCRIPTION

Figure 1:
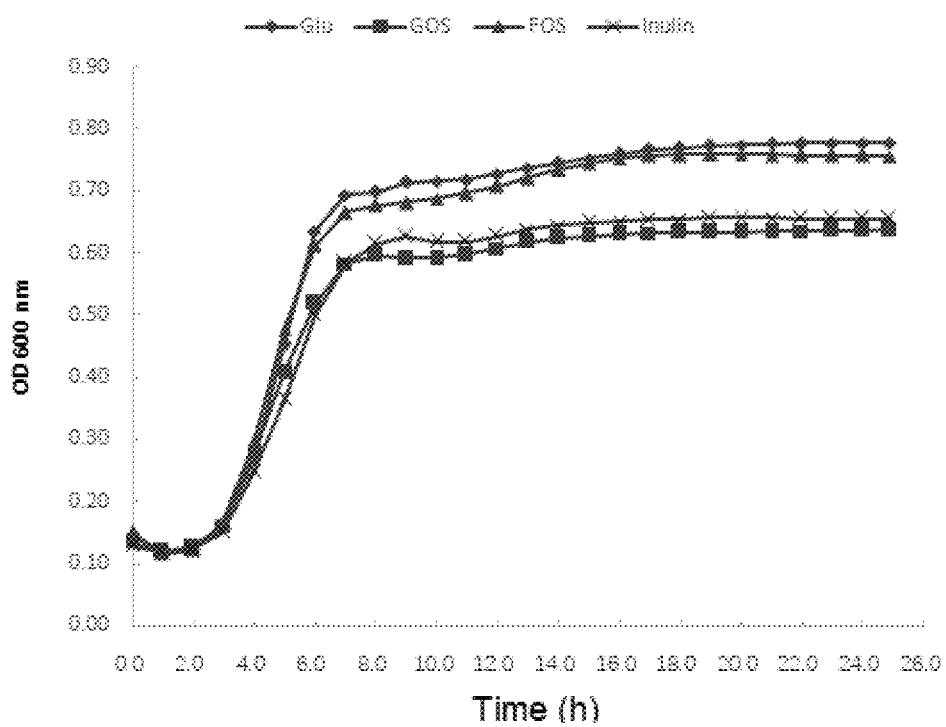
FIG. 1 is the diagram of the growth rate of Bacillus coagulans VHProbi C08 cultured with different prebiotics and glucose.

The *Bacillus coagulans* VHProbi C08 strain of the present invention was screened from the samples of sour cabbage, and has been deposited in the China Center for Type Culture Collection of Wuhan University, Wuhan, China on Sep. 23, 2019, of which the accession number is CCTCC M 2019738.

*Bacillus coagulans* VHProbi C08 does not produce hemolysin, thus does not lyse blood cells, and it is sensitive to common antibiotics, and has good biological safety. It can tolerate relatively high salinity degree with a maximum salt concentration of 7%, grow in a relatively wide temperature range, and produce spores with strong heat resistance, which is convenient for the later industrial processing of this probiotic strain. The VHProbi C08 cell has a cell surface hydrophobicity of 8.58% in vitro, and can adhere to intestinal cells.

*Bacillus coagulans* VHProbi C08 has strong antioxidant function, wherein the clearance rate of DPPH free radicals is 87.80%, and the clearance rate of HRS free radicals is 47.79%. The inhibition rate of the supernatant thereof against lipid peroxidation is 84.46%, and the inhibition rate of the strain cells against lipid peroxidation is 44.88%.

*Bacillus coagulans* VHProbi C08 has strong ability to degrade cholesterol, wherein the in vitro cholesterol degradation rate reaches 39.21%. In the mouse model of hyperlipidemia, after the *Bacillus coagulans* VHProbi C08 provided by the present invention was given to the model mice for 30 days, the blood cholesterol level of mice in the pre-treatment group was reduced by about 34%, and the blood cholesterol level of mice in the post-treatment group was reduced by about 10%; after 40 days, the blood cholesterol level of mice in the *Bacillus coagulans* VHProbi C08 pre-treatment group was reduced by about 39%, and the blood cholesterol level of mice in the post-treatment group was reduced by about 30%, showing a very significant effect.

*Bacillus coagulans* VHProbi C08 can effectively prevent and relieve diarrhea and inhibit intestinal peristalsis. After 7 days of continuous administration of *Bacillus coagulans* VHProbi C08 to rats, the time of diarrhea was effectively delayed, and the amount of feces was reduced. The organic acids and other metabolites produced by the metabolism of *Bacillus coagulans* VHProbi C08 can inhibit the growth of harmful bacteria, promote the digestion and absorption of nutrients in the intestinal tract, restore the microbial barrier function of the intestinal tract, stimulate the immune function of the body, and shorten the disease course.

The present invention will be further described below in conjunction with specific examples.

Example 1 Metabolism Test of *Bacillus coagulans* VHProbi C08 Using Three Different Prebiotics and Glucose (1) Growth Rate Test
1. Test Method:

1.5 g of peptone, 0.6 g of yeast extract, 0.1 g of Tween 80 and 0.5 mL of saline solution were measured and added to 100 mL of distilled water, and the resulting mixture was adjusted to pH 7.4±0.2, and autoclaved at 121° C. for 15 min to serve as the basic culture medium. Glucose, fructooligosaccharide (FOS), galactooligosaccharide (GOS) and inulin solutions with a concentration of 10 g/100 mL were respectively prepared and filtered with a 0.22 μm sterile filter. Under the sterile condition, 20 μL of each sterilized sugar solution was added to each well of a 96-well plate, and 4 parallels were set for each sugar solution. Then 170 μL of the sterilized basic culture medium was added to each well, then 10 μL of inoculum was added. The wells without the addition of cells served as control. 50 μL of liquid paraffin was added to each well to prevent evaporation of water during the incubation. The plate was put into a microplate reader and incubated at 40° C. for measuring the absorbance of $OD_{600}$.

2. Test Results:

The *Bacillus coagulans* VHProbi C08 cultured in the FOS-containing medium first reached an $OD_{600}$ of 0.5, and the cells cultured in the glucose-containing medium almost simultaneously reached this value, followed by the cells cultured in the inulin-containing medium and GOS-containing medium. The *Bacillus coagulans* VHProbi C08 cultured in the FOS-containing medium first reached plateau phase, followed by the cells cultured in the media containing glucose, inulin and GOS, wherein the cells cultured in the media containing FOS or glucose reached plateau phase almost at the same time, which was significantly earlier than that of the cells cultured in the other two media. Thus, the *Bacillus coagulans* VHProbi C08 in media containing FOS prebiotics or glucose grew at comparable rates. The experimental results are shown in FIG. 1.

(2) Analysis of the Total Protein Expression of *Bacillus coagulans* VHProbi C08 Cultured in Three Different Prebiotics and Glucose Using MALDI-TOF-MS 1. Test Method:

1.5 g of peptone, 0.6 g of yeast extract, 0.1 g of Tween 80 and 0.5 mL of saline solution were measured and added to 100 mL of distilled water, the resulting mixture was adjusted to pH 7.4±0.2, and autoclaved at 121° C. for 15 min to serve as the basic culture medium. Glucose, fructooligosaccharide (FOS), galactooligosaccharide (GOS) and inulin solutions with a concentration of 10 g/100 mL were respectively prepared and filtered with a 0.22 μm sterile filter, and the filtered solutions were added to the basic culture medium, respectively.

Fresh culture was inoculated into the obtained culture medium at an amount of 0.1%, then the culture was incubated at 40° C. and 150 rpm for 24 hours. The cells were collected, washed with sterile water for 4 times, and supernant of the cultures were discarde. Then a little amount of fresh cells was spread evenly on a plate to form a thin film, and 1 μL of matrix solution was added to cover the sample. The sample was dried in the air and the plate was put into the mass spectrometer for identification. The "Spectrum List" and "List Mark Peaks" were then presented using Autofms 1000 analysis software.

Figure 2A:
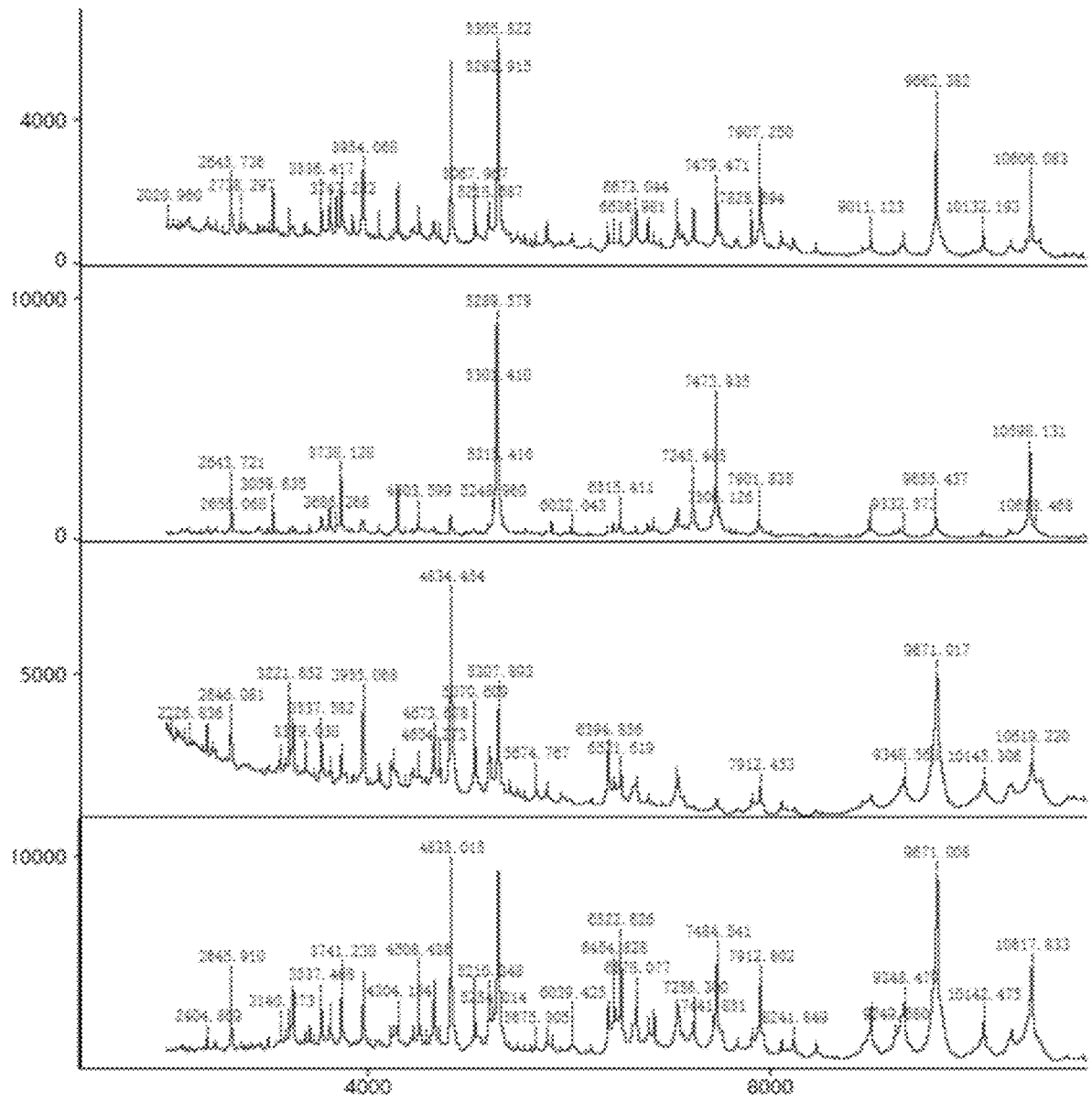
Figure 2B:
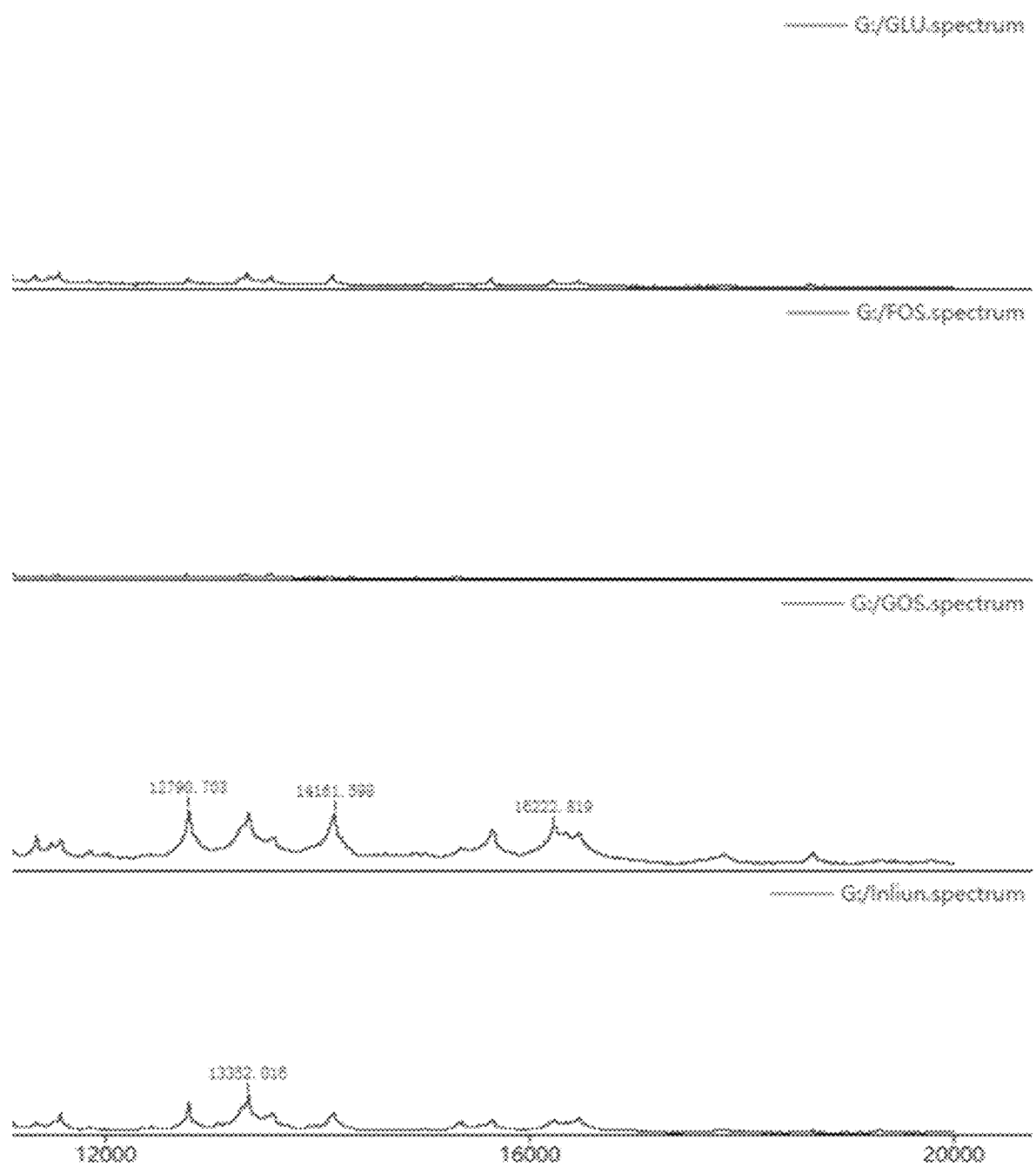

2. Test Results:

The results are shown in FIG. 2, wherein from top to bottom, the spectrum of the total proteins of *Bacillus coagulans* VHprobi C08 grown under the conditions of glucose, FOS, GOS and inulin respectively was shown. As cshown in FIG. 2, in addition to glucose, *Bacillus coagulans* VHprobi C08 can also metabolize and utilize these three prebiotics, FOS, GOS and inulin, and the types of proteins in the metabolites were similar but not the same. Compared with the cells cultured in FOS, the types of proteins produced by the cells using glucose, GOS or inulin as carbon sources were more similar. When *Bacillus coagulans* VHprobi C08 was cultured in the medium containing inulin or FOS as the carbon source, the concentrations of proteins in the metabolites were relatively close, which were significantly higher than those of the cells cultured in the other two media. Among the metabolites produced by *Bacillus coagulans* VHprobi C08 in these four media, there were many types of small proteins with molecular weights below 5 KD. Among the metabolites produced by the cells using GOS or inulin as carbon source, relatively more types of proteins have a molecular weight of 5-10 KD. The types of proteins with molecular weights greater than 10 KD produced by the cells cultured in GOS medium were significantly more than those produced in the other three media.

Protein with a molecular weight of about 4830 D had relatively high concentration in the metabolites produced by the cells using glucose, GOS or inulin as the carbon sources, but almost did not present in the metabolites produced by the cells using FOS as the carbon source. Protein with a molecular weight of about 5300 D had a relatively low concentration in the metabolites produced by the cells using GOS as the carbon source, while it had relatively high concentrations in the metabolites produced by the cells using the other three media. Protein with a molecular weight of about 2738 D was only present in a small amount in the metabolites produced by the cells using glucose as the carbon source. Moreover, the concentrations of proteins of 9670 D, 7480 D and 3955 D were significantly different in different metabolites, and it was speculated that the genes encoding these proteins were related to metabolism.

The above results indicated that the three different types of prebiotics, FOS, GOS and inulin, could be utilized by *Bacillus coagulans* VHprobi C08 and could promote the proliferation of *Bacillus coagulans* VHprobi C08. The combination of probiotics and prebiotics facilitated colonization of *Bacillus coagulans* in the gut, thereby laying a foundation for probiotic functions. When FOS, GOS and inulin were used as the carbon sources, *Bacillus coagulans* VHprobi C08 can metabolize them to produce proteins of different molecular weights, which may exert functions such as resisting pathogens, regulating immunity, increasing mineral absorption, improving intestinal function, and affecting metabolism and satiety in the gut, thereby showing a potential probiotic effect of regulating blood glucose.

Example 2 Whole Genome Sequencing and Comparative Genomic Analysis Results of *Bacillus coagulans* VHProbi C08

1. Sequencing Method:
1.1 BGISEQ Sequencing Platform

The genomic DNA of *Bacillus coagulans* VHProbi C08 was extracted and randomly broken, then the DNA fragments of the required length were recovered by electrophoresis, adapters were added to the DNA fragments for cluster preparation, and the obtained clusters were finally sequenced on the machine.

1.2 PacBio Sequencing Platform

The genomic DNA of *Bacillus coagulans* VHProbi C08 was first processed by g-TUBE into fragments of appropriate size, and then the fragments were subjected to damage repair and end repair. Both ends of the DNA fragments were added with adapters in a hairpin structure to form a dumbbell structure, which was then mixed with polymerase for sequencing.

2. Method for Sequencing Data Analysis
2.1 Sequencing Data:

Low-quality data were filtered out of the raw off-machine data of each sequencing platform to obtain available data for subsequent analysis.

2.2 Assembly:

Based on the available data of each sequencing platform, the sequencing samples were analyzed for genome estimation, sequence assembly and result evaluation to finally obtain the genome sequences of the sequencing samples;

2.3 Genome Component Analysis:

After the assembled sequences of the samples were obtained, functional elements in the sample genome were predicted, including gene components, repetitive sequences, non-coding RNAs, etc.;

2.4 Gene Function Analysis:

After the genes were predicted, the genes were subjected to the database alignment and annotation, which provided the function and description information of each gene through sequence similarity.

2.5 Comparative Genomics Analysis:

Based on the comparison of the genome sequences and gene set sequences of the sequenced sample with the reference sequence, the difference and evolutionary relationship between the sequenced sample and the reference sequence were displayed. This analysis included common and unique genes, gene families, and species evolution.

3. Sequencing Results, Analysis and Prediction
3.1. Genome Assembly Results

The genome was circular, and had a full length of 3,666,784 bp and a GC content of 46.24%.

3.2. Analysis Results of Gene Composition

The genome of *Bacillus coagulans* VHProbi C08 was subjected to gene prediction to obtain the open reading frame and gene length distribution. The specific statistical results are shown in Table 1.

TABLE 1

| Gene statistics | | | | | |
|---|---|---|---|---|---|
| Full length of whole genome (bp) | Number of genes | Total length of genes (bp) | Average length of genes (bp) | Total length of genes/full length of genome (%) | GC content of genes |
| 3,666,784 | 4123 | 3,103,698 | 752.78 | 84.64 | 46.88 |

Figure 3:
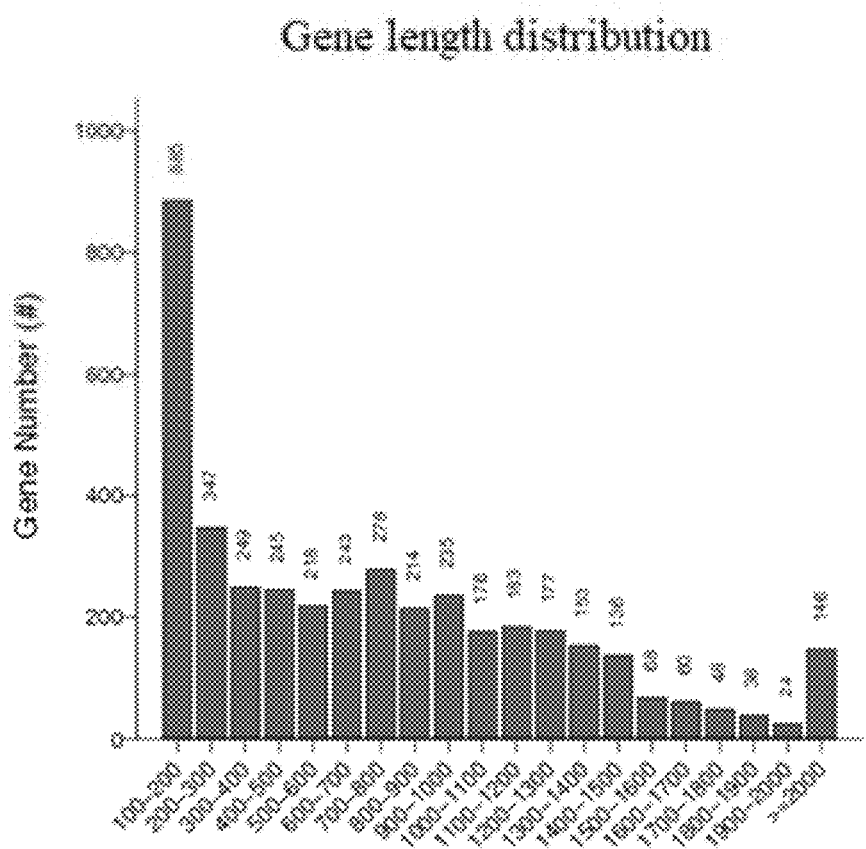
FIG. 3 is the diagram of gene length distribution of *Bacillus coagulans* VHProbi C08.

The diagram of gene length distribution is shown in FIG. 3, wherein the abscissa is the gene length, and the ordinate is the number of genes corresponding to the gene length.

3.3. Analysis Results of Non-Coding RNAs

The prediction results of the three non-coding RNAs, tRNA, rRNA, and sRNA on the genome of *Bacillus coagulans* VHProbi C08 are shown in Table 2.

TABLE 2

Statistics of non-coding RNAs

| Type of non-coding RNAs | Number of copies | Average length (bp) | Total length (bp) | Percentage of genome (%) |
|---|---|---|---|---|
| tRNA | 83 | 76.86 | 6380 | 0.1740 |
| 5s_rRNA | 10 | 115 | 1150 | 0.0313 |
| 16s_rRNA | 10 | 1541.9 | 15419 | 0.4205 |
| 23s_rRNA | 10 | 2931 | 29310 | 0.7993 |
| sRNA | 10 | 84.2 | 842 | 0.0230 |

3.4 Analysis Result of Repetitive Sequences

The prediction results of repetitive sequences in *Bacillus coagulans* VHProbi C08 genome are shown in Table 3.

TABLE 3

Statistics of repeated sequences

| Type of repeated sequences | Number of repeated sequences | Size of one repeat unit (bp) | Total length of repetitive sequences (bp) | Percentage of genome (%) |
|---|---|---|---|---|
| Tandem repeated sequences | 351 | 5-327 | 54711 | 1.4921 |
| Small satellite DNA | 186 | 15-65 | 38424 | 1.0479 |
| Micro-satellite DNA | 2 | 5-9 | 65 | 0.0018 |

3.5 COG Database Annotation

Figure 4:
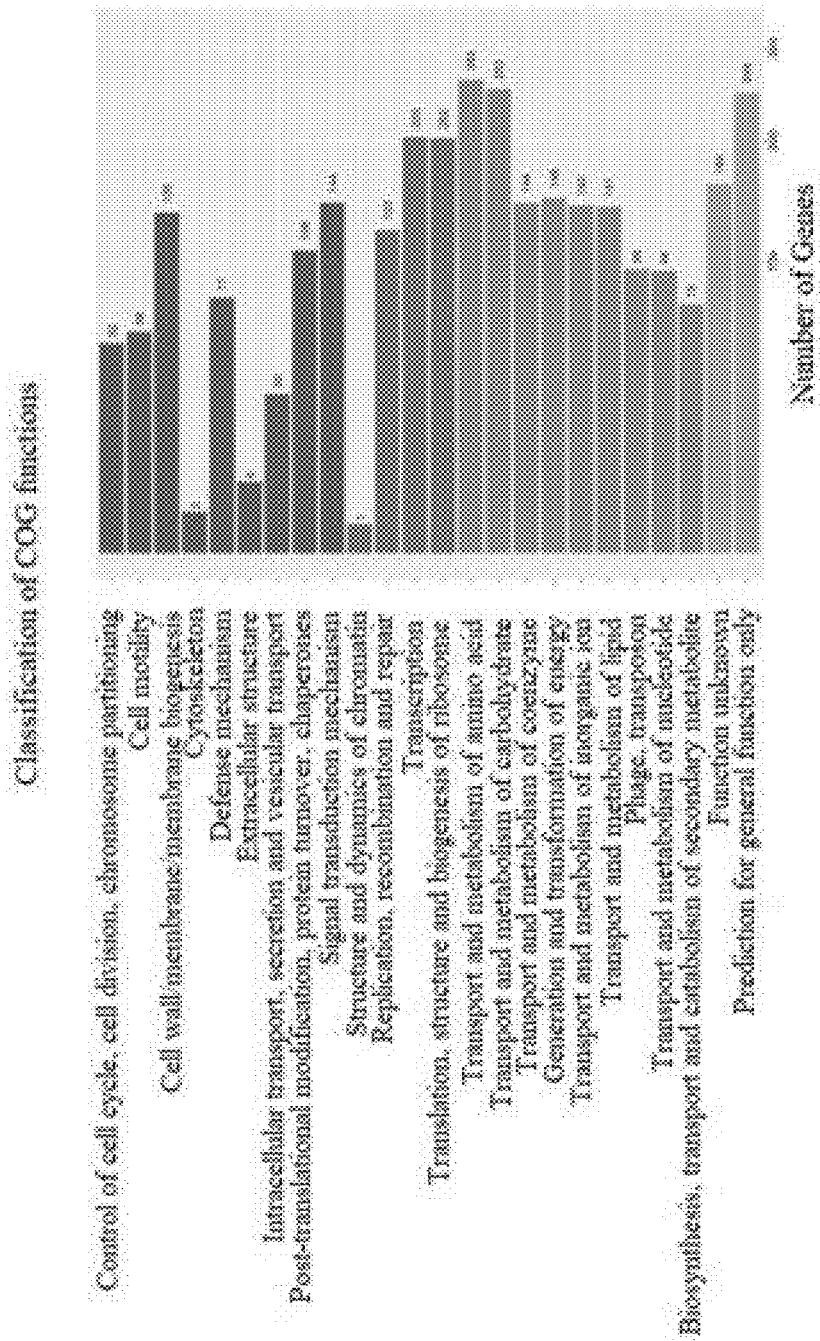
FIG. 4 is the diagram of the COG statistical results of *Bacillus coagulans* VHProbi C08.

The COG statistics results are shown in FIG. 4. The abundant sugar transport metabolism-related proteins and a large number of functionally unknown proteins suggested that *Bacillus coagulans* VHProbi C08 may have better metabolic diversity and environmental adaptability.

3.6 Genome Circle Map

Figure 5:
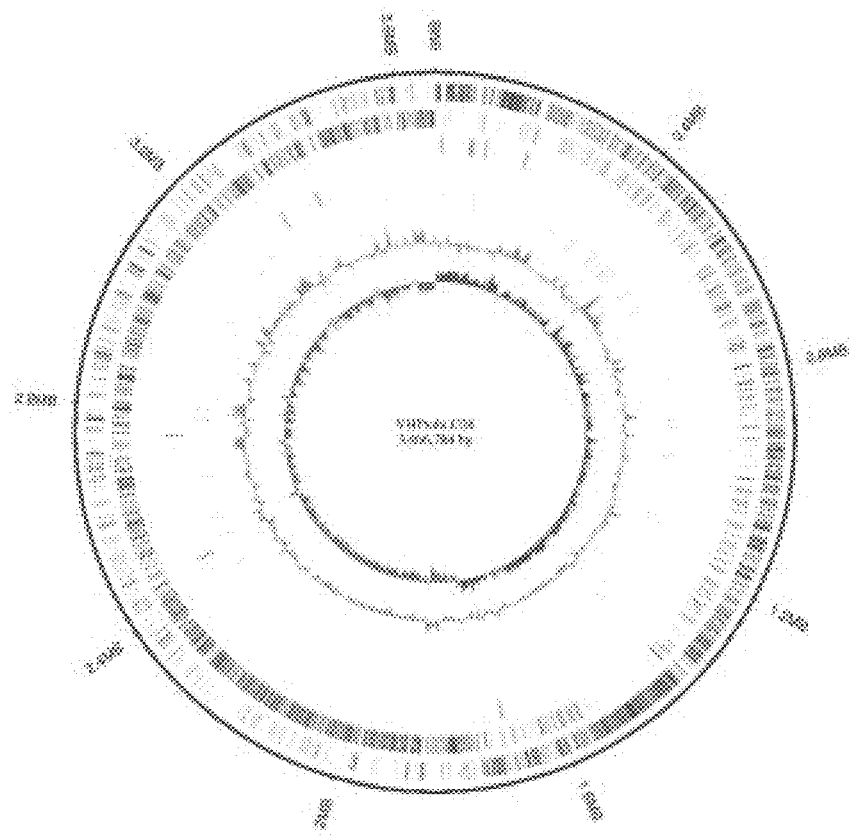
FIG. 5 is the circle genome map of *Bacillus coagulans* VHProbi C08.

According to the genome sequence of *Bacillus coagulans* VHProbi C08, the GC skew analysis was performed using (G−C)/(G+C) calculation method, and the distribution of each element was displayed on the genome according to the data results such as gene distribution, non-coding RNA distribution and annotation. The results are shown in FIG. 5.

4. Comparative Genomics

4.1 Common and Unique Genes

Figure 6:
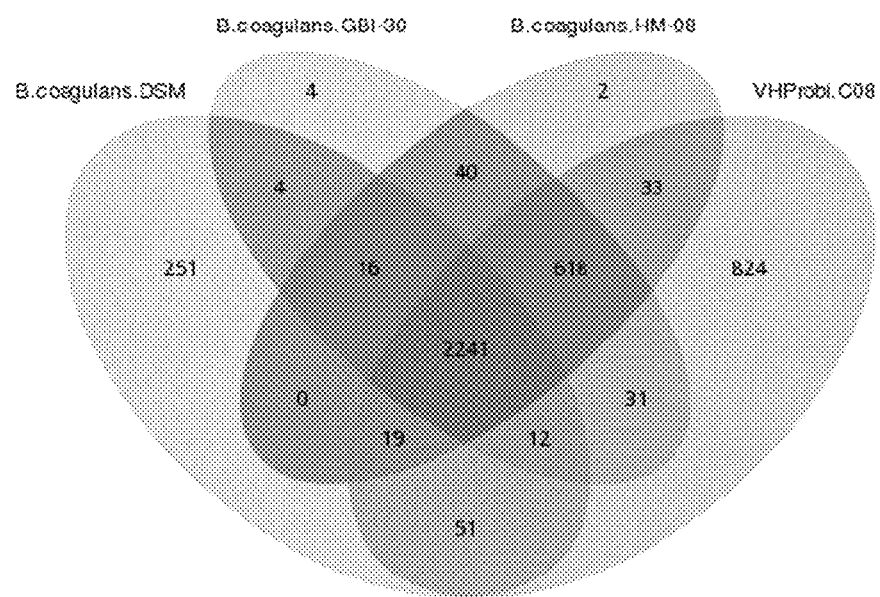
FIG. 6 is the Venn diagram of the Pan-genome of *Bacillus coagulans* VHProbi C08 and various *Bacillus coagulans* strains.

The common and unique genes of *B. coagulans* VHProbi C08, *B. coagulans* DSM, *B. coagulans* GBI-30, and *B. coagulans* HM-08 were analyzed and compared. The gene sets of each strain and the statistical results of Core and Pan gene analysis are shown in the Table 4 and Table 5. The Venn diagram of the Pan-genome of various strains is shown in FIG. 6.

TABLE 4

Statistical table of genes from the indicated strains

| Strain name | Number of genes |
|---|---|
| *B. coagulans* VHProbi C08 | 4,123 |
| *B. coagulans* DSM | 2,666 |
| *B. coagulans* GBI-30 | 3,060 |
| *B. coagulans* HM-08 | 3,079 |

TABLE 5

Statistical table of Core and Pan gene protein

| CoreGene Num | CoreGene Size (bp) | PanGene Num | PanGene Size(bp) | Dispensable Num | Dispensable Size(bp) |
|---|---|---|---|---|---|
| 2,241 | 678,565 | 4,146 | 1,024,876 | 824 | 230,524 |

Description: CoreGene Num refers to the number of common genes; CoreGene Size refers to the length of common genes; PanGene Num refers to the number of all non-redundant genes; PanGene Size refers to the length of all non-redundant genes; Dispensable Num refers to the number of dispensable genes; Dispensable Size refers to the length of dispensable genes.

The number of total genes and the number of indispensable genes of *Bacillus coagulans* VHProbi C08 were significantly more than those of the other three comparative strains, suggesting that these unique genes may be closely related to the functional characteristics of the strain.

4.2 Gene Families

The gene families among *Bacillus coagulans* VHProbi C08, *B. coagulans* DSM, *B. coagulans* GBI-30, and *B. coagulans* HM-08 were analyzed and compared, and the analysis results are shown in Table 6.

TABLE 6

Statistical table of gene families

| Strain Name | Gene Number | Clustered Gene | UnClustered Gene | Family Num | Unique Family |
|---|---|---|---|---|---|
| *B. coagulans* VHProbi C08 | 4,123 | 3,328 | 795 | 2,313 | 22 |
| *B. coagulans* DSM | 2,666 | 2,482 | 184 | 1,932 | 9 |
| *B. coagulans* GBI-30 | 3,060 | 3,056 | 4 | 2,279 | 1 |
| *B. coagulans* HM-08 | 3,079 | 3,076 | 3 | 2,280 | 0 |

Description: Gene Number refers to the number of genes of each strain; Clustered Gene refers to the number of genes that can be clustered into gene families; UnClustered Gene refers to genes that have not been clustered into any family; Family Num refers to the number of gene families of a strain; Unique Family refers to the number of the strain-specific gene families.

4.3 Species Evolution

Figure 7:
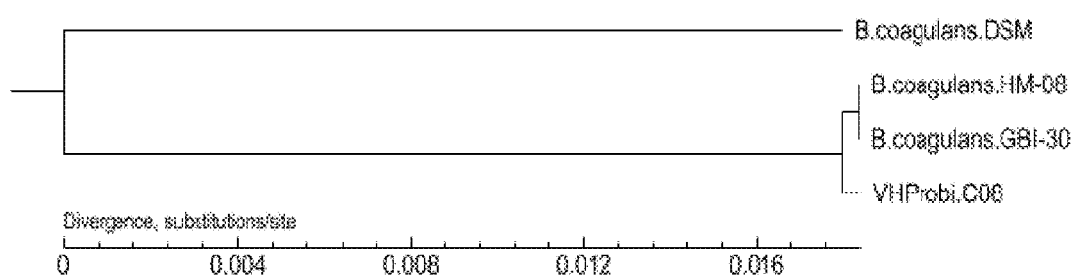
FIG. 7 is the phylogenetic tree of various strains based on CorePan1 analysis results.
Figure 8:
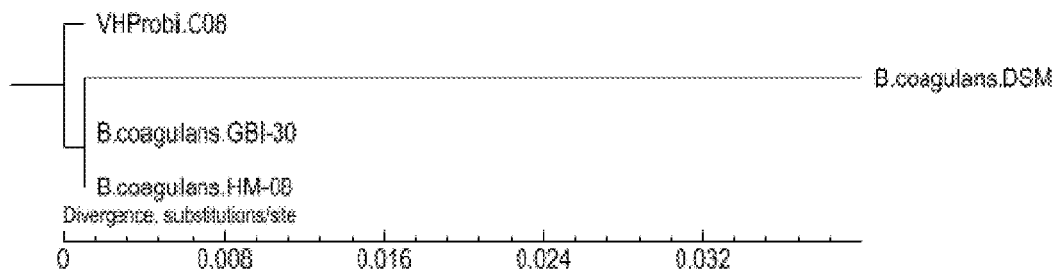
FIG. 8 is the phylogenetic tree of various strains based on GeneFamily1 analysis results.

A phylogenetic tree shown in FIG. 7 was constructed based on the results of CorePan1 analysis among strains of *Bacillus coagulans* VHProbi C08, *B. coagulans* DSM, *B. coagulans* GBI-30, and *B. coagulans* HM-08, A phylogenetic tree shown in FIG. 8 was constructed based on the results of GeneFamily1 analysis among strains of *Bacillus coagulans* VHProbi.C08, *B. coagulans* DSM, *B. coagulans* GBI-30, and *B. coagulans* HM-08, A protein (VHProbi C08GL003330) with unknown function was identified from *Bacillus coagulans* VHProbi C08 through the whole genome sequencing, which had a SPFH domain similar to the lipid raft characteristic protein Flotillin. The protein Flotillin is closely related to the CAP/Cb I pathway of insulin signaling, and it can participate in the regulation of transport and absorption of glucose stimulated by insulin. Therefore, it is speculated that the protein VHProbi C08GL003330 may be related to the function of *Bacillus coagulans* VHProbi C08 on lowering blood glucose.

In addition, a complete synthesis pathway of vitamin K was also found, and the related proteins are shown in Table 7. Vitamin K is thought to play a positive role in controlling blood glucose.

TABLE 7

Statistical table of genes related to vitamin K synthesis

| Name | Gene number | Definition |
| --- | --- | --- |
| MenF | VHProbi C08GL002803 | Salicylate synthase |
| MenD | VHProbi C08GL002802 | 2-succinyl-5-enolpyruvyl-6-hydroxy-3-cyclohexene-1-carboxylate synthase |
| MenH | VHProbi C08GL002801 | 2-succinyl-6-hydroxy-2,4-cyclohexadiene-1-carboxylate synthase |
| MenC | VHProbi C08GL002797 | o-succinylbenzoate synthase |
| MenE | VHProbi C08GL002798 | o-succinate-CoA ligase |
| MenB | VHProbi C08GL002800 | Naphthoate synthase |
| E3.1.2.28 | VHProbi C08GL002892 | 1,4-dihydroxy-2-naphthoyl-CoA hydrolase |
| MenA | VHProbi C08GL002804 | 1,4-dihydroxy-2-naphthoate polyprenyltransferase |
| UbiE MenG | VHProbi C08GL002168 | Demethylmenaquinone methyltransferase |

Example 3: Effects of *Bacillus coagulans* VHProbi C08 on Blood Glucose Levels

1 Experimental Material 1.1 Experimental Animals 24 of 8-week-aged male BALB/c mice, SPF grade, weighing 150-200 g, were provided by Jinan Pengyue Experimental Animal Breeding Co., Ltd. with production license number SOCK (Lu) 20190003.

Quarantine and labeling of animals: After all animals arrived, the acclimatization period was at least one week for quarantine observation, and the activities, diet and other performances of animals were observed. Animals must be checked and qualified before the test, and only qualified animals can be used for the test. After the animals were quarantined and qualified, each animal was assigned with a single animal number, and marked at the tail. The subject number, animal number, cage number, gender, animal receiving date and subject manager were marked on the cage card during the quarantine and observation period. After the animals were grouped, the subject number, animal number, cage number, gender, group, start and end date of the experiment and subject manager were marked on the cage card.

Environmental conditions for the feeding and management of experimental animals: the room temperature was 20–26° C., the daily temperature difference was ≤4° C., the relative humidity was 40-70%, and the alternation time of light and dark was 12/12 h. Animals were kept in standard rat cages, 6 per cage.

Feed and drinking water for animals: free access to food and water. The feed was growth and breeding feed for SPF grade rat and mouse, provided by Jinan Pengyue Experimental Animal Breeding Co., Ltd. (Lot: 20190905). The drinking water was city tap water that has been sterilized at a high temperature.

1.2 Reagents and Instruments

Streptozotocin (STZ) (Lot: S0130-50MG), SIGMA-Aldrich. Citric acid (Lot: T8060), Solarbio; Sodium citrate (Lot: C1013) Solarbio; Johnson & Johnson Onetouch Ultra blood glucose meter.

2 Experimental Methods 2.1 Preparation of Solution

Preparation of Bacterial Powder:

*Bacillus coagulans* VHProbi C08 powder was dissolved in saline to prepare a bacterial powder solution with a concentration of 0.1 g/ml ($10^9$ CFU/ml).

Preparation of STZ in Sodium Citrate Buffer

Preparation of solution A and solution B: 2.1 g of citric acid was weighed into 100 mL $ddH_2O$ to prepare a solution A; 2.94 g of Na Citrate was weighed into 100 mL $ddH_2O$ to prepare a solution B. Solution A and B were mixed according to a ratio of 1:1.32. The pH value of the obtained mixture was measured with a pH meter and adjusted to 4.2-4.5 to obtain a sodium citrate buffer. An appropriate amount of STZ was weighed and dissolved in the 0.1 $mol \cdot L^{-1}$ citric acid-sodium citrate buffer to prepare 1% STZ solution. The solution was prepared for immediate use, kept away from light and on ice.

2.2 Modeling, Grouping and Administration

SPF grade BALB/c mice were grouped and administered after 4 days of adaptive feeding. Qualified mice were randomly divided into 4 groups, namely blank group, positive control group (modeling but without probiotic treatment group), probiotic pre-treatment group, and probiotic post-treatment group, with 6 mice in each group. After the mice were grouped, the positive control group, the probiotic pre-treatment group and the probiotic post-treatment group were intraperitoneally injected with streptozotocin 60 mg/kg/d for 12 consecutive days for modeling. Meanwhile, the probiotic pre-treatment group was given *Bacillus coagulans* VHProbi C08 at $10^9$ CFU/animal/day until the end of the experiment. On the 12th day when the modeling was completed, the probiotic post-treatment group began to be given *Bacillus coagulans* VHProbi C08 at $10^9$ CFU/animal/day until the end of 6 weeks. On the 12th day when the modeling was completed, the blank group and positive control group were given the same volume of MRS medium until the end of 6 weeks.

The food intake, water intake and urine output of the mice were observed every day. From the 0th week after the modeling was completed, blood samples were collected from the tail of all mice once to measure the fasting blood glucose level using glucose oxidase method every 2 weeks for 6 consecutive weeks.

3 Statistics Analysis Method

All experimental data were expressed as mean±standard deviation "$\bar{X} \pm SD$", data statistics analysis and graphing were performed using Microsoft EXCEL software, the comparison of data between two groups was performed using t test, and $P<0.05$ was considered as a significant difference.

4 Experimental Results

After the modeling started, the mice in the positive control group, the probiotic pre-treatment group, and the probiotic post-treatment group showed increases in the water intake, feed intake, and also the urine output, showing symptoms of a hyperglycemic diet. After the modeling was completed, compared with the blank group, the blood glucose levels of mice in the positive control group, the probiotic pre-treatment group and the probiotic post-treatment group were ≥7 mM, which were significantly higher than that of the blank group, indicating that the hyperglycemia model mice were successfully established.

TABLE 8

Fasting blood glucose level of mice in each group

| | 0 week | 2 weeks | 4 weeks | 6 weeks |
|---|---|---|---|---|
| Blank group | 8.13 ± 0.48 | 8.55 ± 0.28 | 8.23 ± 0.36 | 7.94 ± 0.65 |
| Positive group | 17.52 ± 0.77 | 16.73 ± 0.32 | 16.08 ± 0.76 | 16.11 ± 0.52 |
| Pre-treatment group | 16.25 ± 1.86 | 12.02 ± 0.51 | 10.98 ± 0.27 | 8.63 ± 1.47 |
| Post-treatment group | 17.19 ± 1.04 | 15.27 ± 1.85 | 13.08 ± 1.63 | 11.66 ± 1.26 |

Figure 9:
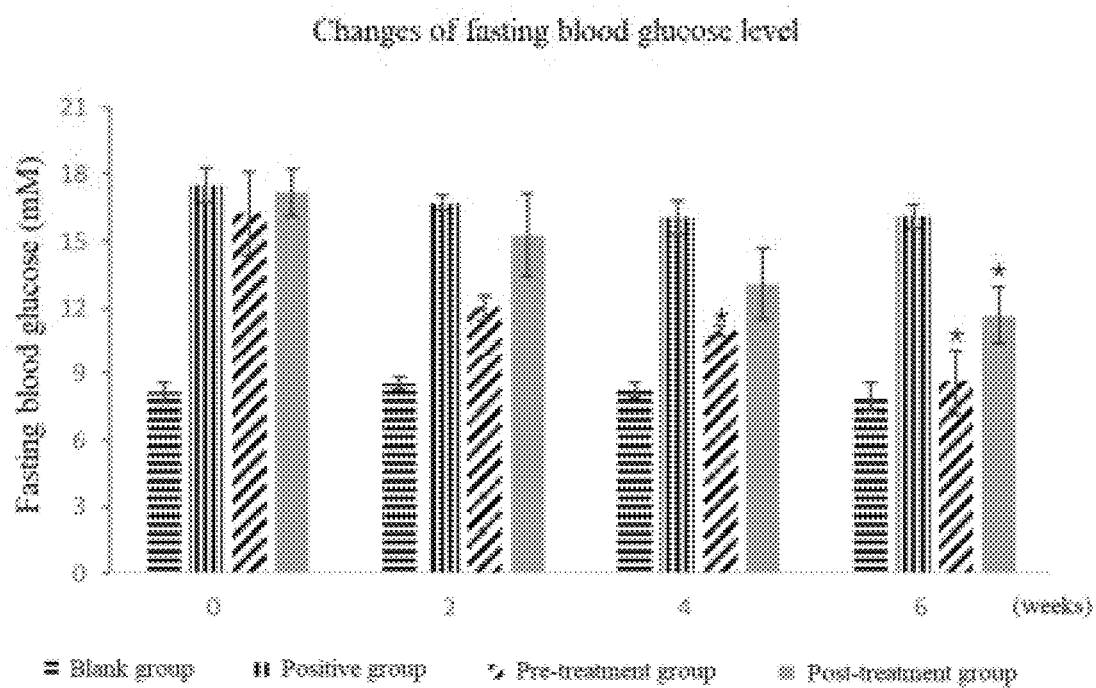
FIG. 9 is the diagram of changes of fasting blood glucose levels in mice, wherein * represents P<0.05 compared with the positive group.

When the modeling was completed, the fasting blood glucose level of the mice in the probiotic pre-treatment group was slightly lower than that in the positive control group and the probiotic post-treatment group. When the probiotic was continuously intragastrically administered until the fourth week, compared with the positive control group, the blood glucose level of mice in the probiotics pre-treatment group decreased with a significant difference ($P<0.05$), and the fasting blood glucose level decreased by 31.7%. When the probiotic was continuously intragastrically administered until the sixth week, compared with the positive control group, the blood glucose levels of mice in the pre-treatment group and post-treatment group were significantly lower than that in the positive control group with a significant difference ($P<0.05$), the fasting blood glucose level of mice in the pre-treatment group was reduced by 46.46%, the fasting blood glucose level of mice in the post-treatment group was reduced by 27.6%, and the blood glucose level of mice in the probiotic pre-treatment group was restored to the blood glucose level of mice in the blank group. The test results are shown in FIG. 9.

Based on the above results, compared with the positive control group, the fasting blood glucose levels of mice in the Bacillus coagulans VHPriobi C08 pre-treatment and post-treatment groups were observed to be decreased, indicating that Bacillus coagulans VHPriobi C08 has a potential probiotic effect on reducing blood glucose levels. In recent years, with the improvement of life quality, diabetes is widely prevalent all over the world, and has gradually become the third major disease that endangers human health after cardiovascular diseases and tumors. Therefore, developing effective diabetes drugs and health foods has become a research hotspot in this field. Research shows that probiotics can reduce symptoms of high blood glucose. As one of the edible lactic acid bacterial in China, the safety of Bacillus coagulans has been widely recognized. The Bacillus coagulans VHProbi C08 provided by the present invention meets the requirements of regulations and it can be used as a source of raw materials, and it has no risk of side effects and overdose when taken for a long time. The Bacillus coagulans VHProbi C08 provided by the present invention can utilize three different types of prebiotics and glucose as carbon sources, and the whole genome sequencing analysis shows that it has proteins related to blood glucose reduction efficacy and a complete vitamin K synthesis pathway. In addition, the fasting blood glucose level of the STZ-induced hyperglycemia model mice can be reduced by the Bacillus coagulans VHProbi C08, indicating it has important potential probiotic value. Bacillus coagulans VHProbi C08 has the characteristic of heat resistance and good spore formation rate, so that it can be added to most kinds of foods to prepare functional foods with blood glucose reducing function. The fermentation conditions for Bacillus coagulans VHProbi C08 with potential probiotic properties of blood glucose reducing function is simple, the industrialization cost is low and the market prospects are broad, making it a probiotic strain with great economic value.

What is claimed is:

1. A method for reducing blood glucose, comprising administering a Bacillus coagulans strain VHProbi C08 to a subject in need thereof, wherein the Bacillus coagulans strain VHProbi C08 is deposited in the China Center for Type Culture Collection of Wuhan University, China on Sep. 23, 2019, with an accession number of CCTCC M 2019738.

2. A method for culturing a Bacillus coagulans strain VHProbi C08, comprising culturing the Bacillus coagulans strain VHProbi C08 in a culture medium comprising a carbon source, wherein the carbon source is selected from the group consisting of fructooligosaccharides, galactooligosaccharides, inulin, and a mixture thereof;

wherein the Bacillus coagulans strain VHProbi C08 is deposited in the China Center for Type Culture Collection of Wuhan University, China on Sep. 23, 2019, with an accession number of CCTCC M 2019738.

* * * * *